US007923035B2

(12) United States Patent
Ii et al.

(10) Patent No.: US 7,923,035 B2
(45) Date of Patent: Apr. 12, 2011

(54) HUMIDITY-DEPENDENT ANTIBACTERIAL POWDERY COMPOSITION, PROCESS FOR PRODUCING THE SAME, HUMIDITY-DEPENDENT ANTIBACTERIAL FOOD STORING ARTICLE AND METHOD OF STORING FOOD

(75) Inventors: Shigeo Ii, Tokyo (JP); Asami Takata, Hyogo (JP); Yuichi Mizukami, Tokyo (JP); Ikuo Yashiki, Kanagawa (JP)

(73) Assignee: Mitsubishi-Kagaku Foods Corporation, Tokyo (JP)

( * ) Notice: Subject to any disclaimer, the term of this patent is extended or adjusted under 35 U.S.C. 154(b) by 1107 days.

(21) Appl. No.: 10/532,077

(22) PCT Filed: Oct. 22, 2003

(86) PCT No.: PCT/JP03/13469
§ 371 (c)(1),
(2), (4) Date: Apr. 21, 2005

(87) PCT Pub. No.: WO2004/037023
PCT Pub. Date: May 6, 2004

(65) Prior Publication Data
US 2006/0013884 A1    Jan. 19, 2006

(30) Foreign Application Priority Data
Oct. 25, 2002   (JP) ................................ 2002-311677

(51) Int. Cl.
*A61K 9/16* (2006.01)
*A61K 31/26* (2006.01)
*A23B 4/20* (2006.01)
*A01N 25/00* (2006.01)
*A01N 25/34* (2006.01)
*A61K 9/14* (2006.01)
*A21D 4/00* (2006.01)
*A23B 7/154* (2006.01)
*A23L 3/00* (2006.01)
*A23L 3/3463* (2006.01)
*A23L 3/3535* (2006.01)
*B65D 81/28* (2006.01)

(52) U.S. Cl. ........ 424/496; 424/405; 424/408; 424/484; 424/485; 424/489; 426/323; 426/326; 426/335; 514/514

(58) Field of Classification Search .................. None
See application file for complete search history.

(56) References Cited

U.S. PATENT DOCUMENTS
5,985,303 A * 11/1999 Okada et al. ............... 424/405

FOREIGN PATENT DOCUMENTS

| CN | 1146303 A | * | 4/1997 |
|----|-----------|---|--------|
| JP | 04-079869 |   | 3/1992 |
| JP | 4-79869 A |   | 3/1992 |
| JP | 07-046973 |   | 2/1995 |
| JP | 7-46973 A |   | 2/1995 |
| JP | 07046973 A | * | 2/1995 |
| JP | 08266256 A |   | 10/1996 |
| JP | 09117270 A |   | 5/1997 |
| JP | 09-215485 |   | 8/1997 |
| JP | 9-215485 A |   | 8/1997 |
| JP | 10-504223 A |   | 4/1998 |
| JP | 11-180812 A |   | 7/1999 |
| JP | 11319044 A |   | 11/1999 |
| JP | 2000139334 A |   | 5/2000 |
| JP | 2000-157168 A |   | 6/2000 |
| WO | WO 96/39296 A1 |   | 12/1996 |

OTHER PUBLICATIONS

Ross, Z.M., O'Gara, E.A., Hill, D.J., Sleightholme, H.V., & Maslin, D.J.; "Antimicrobial Properties of Garlic Oil against Human Enteric Bacteria: Evaluation of Methodologies and Comparisons with Garlic Oil Sulfides and Garlic Powder"; Jan. 2001, Applied and Environmental Microbiology, vol. (67) No. (1), p. 475-480.*
Notification of Reason for Refusal dated Jan. 10, 2009 issued in corresponding Taiwanese patent Application No. 092129628.
Notification of Reasons for Refusal dated Mar. 17, 2009 issued in corresponding Japanese patent Application No. 2004-546438.
Office Action dated Oct. 6, 2009 issued in corresponding Japanese patent Application No. 2004-546438.

* cited by examiner

*Primary Examiner* — Ernst V Arnold
*Assistant Examiner* — Christopher R Lea
(74) *Attorney, Agent, or Firm* — Westerman, Hattori, Daniels & Adrian, LLP

(57) ABSTRACT

The humidity-dependent antibacterial powdery composition comprises a volatile oily antibacterial substance contained in a high ratio and a water-soluble film forming agent and the behavior of release of the antibacterial substance is changed depending on humidity. The process for producing the same is characterized in that a water-soluble film forming agent optionally together with a powder vehicle is dissolved and/or dispersed in water, subsequently a volatile oily antibacterial substance optionally together with an emulsifying agent is added to the solution and emulsified, and thereafter the obtained emulsion is spray dried into powder. The humidity-dependent antibacterial food storing article is characterized by carrying the humidity-dependent antibacterial powdery composition. The method of storing food is characterized in that the volatile oily antibacterial substance is released from the humidity-dependent antibacterial food storing article toward food lying in an atmosphere of 70% or higher humidity.

9 Claims, No Drawings

HUMIDITY-DEPENDENT ANTIBACTERIAL POWDERY COMPOSITION, PROCESS FOR PRODUCING THE SAME, HUMIDITY-DEPENDENT ANTIBACTERIAL FOOD STORING ARTICLE AND METHOD OF STORING FOOD

TECHNICAL FIELD

The present invention relates to a humidity-dependent antibacterial powdery composition of excellent applicability wherein a volatile oily antibacterial substance can be contained in high ratio; a process for producing the same; a humidity-dependent antibacterial food storing article; and a method of storing food.

BACKGROUND ART

As a substance for preventing fungal outbreak or bacterial growth in food, a volatile oily antibacterial substance such as an isothiocyanate ester represented by allyl isothiocyanate is known. However, since the volatility of the substance is high, it has a characteristic that its effect is decreased in an extremely short time. Therefore, it has a problem in the duration of the effect itself. Accordingly, as one of the means of solving such a problem, a method of forming a humidity-dependent antibacterial powdery composition by enclosing a volatile oily antibacterial substance in a cyclodextrin so as to release the substance only in a high humid atmosphere and employing the composition has been proposed (see, for example, Japanese Patent No. 2,790,772). If a volatile oily antibacterial substance is enclosed in a cyclodextrin, chemical stability, deodorization, antioxidation, photodegradation inhibition, etc. of the substance can be attained, therefore, this method is an excellent method. However, since at most only an equivalent molar amount of volatile oily antibacterial substance is enclosed in the cyclodextrin, the ratio of the substance contained in the antibacterial powdery composition is at most only about 10% by weight. In addition, this antibacterial powdery composition is difficult to release the volatile oily antibacterial substance unless it is in an atmosphere of 90% or higher humidity, therefore, there remains room for improvement in the applicability.

It is therefore an object of the present invention to provide a humidity-dependent antibacterial powdery composition of excellent applicability wherein a volatile oily antibacterial substance can be contained in high ratio; a process for producing the same; a humidity-dependent antibacterial food storing article; and a method of storing food.

DISCLOSURE OF THE INVENTION

The present invention has been accomplished in view of the foregoing matters, according to a first aspect and feature of the present invention, there is provided a humidity-dependent antibacterial powdery composition characterized in that it comprises a volatile oily antibacterial substance and a water-soluble film forming agent and the behavior of release of the antibacterial substance is changed depending on humidity.

According to a second aspect and feature of the present invention, in addition to the first feature, the volatile oily antibacterial substance is an isothiocyanate ester.

According to a third aspect and feature of the present invention, in addition to the first feature, the water-soluble film forming agent is gum arabic.

According to a fourth aspect and feature of the present invention, in addition to the first feature, the composition further comprises a powder vehicle.

According to a fifth aspect and feature of the present invention, in addition to the first feature, the composition shows the behavior of release wherein the releasing ratio of the volatile oily antibacterial substance at 100% humidity is 1.5 times or more than the releasing ratio of the volatile oily antibacterial substance at 75% humidity.

According to a sixth aspect and feature of the present invention, there is provided a process for producing a humidity-dependent antibacterial powdery composition, in which the behavior of release of a volatile oily antibacterial substance is changed depending on humidity characterized in that a water-soluble film forming agent optionally together with a powder vehicle is dissolved and/or dispersed in water, subsequently a volatile oily antibacterial substance optionally together with an emulsifying agent is added to the solution and emulsified, and thereafter the obtained emulsion is spray dried into powder.

According to a seventh aspect and feature of the present invention, there is provided a humidity-dependent antibacterial food storing article characterized by carrying a humidity-dependent antibacterial powdery composition according to the first feature.

According to an eighth aspect and feature of the present invention, there is provided a method of storing food characterized in that a volatile oily antibacterial substance is released from a humidity-dependent antibacterial food storing article according to the seventh feature toward food lying in an atmosphere of 70% or higher humidity.

BEST MODE FOR CARRYING OUT THE INVENTION

The humidity-dependent antibacterial powdery composition of the present invention is characterized in that it comprises a volatile oily antibacterial substance and a water-soluble film forming agent and the behavior of release of the antibacterial substance is changed depending on humidity, wherein the volatile oily antibacterial substance can be contained in high ratio. In addition, the humidity-dependent antibacterial powdery composition of the present invention hardly releases the volatile oily antibacterial substance in an atmosphere of about 60% humidity. However, when it is in an atmosphere of 70% or higher humidity, in which fungi can grow, the volatile oily antibacterial substance will be released, therefore, the composition is excellent in applicability.

The volatile oily antibacterial substance in the humidity-dependent antibacterial powdery composition of the present invention means an oily substance having volatility at normal temperature and exerting an antibacterial effect. For example, an isothiocyanate ester, which is the pungent component of mustard or Japanese horseradish, a monoterpene compound, which is abundantly contained in natural plants, etc. correspond to this. These are natural products obtained from a plant extract or the like, and their safety to the human body is high. In particular, the isothiocyanate ester exerts an excellent antibacterial effect, therefore, it is preferably employed in food hygiene. Incidentally, the volatile oily antibacterial substance is not limited to a natural product but may be a synthetic product synthesized by a known method per se.

Specific examples of the isothiocyanate ester include allyl isothiocyanate, phenyl isothiocyanate, methyl isothiocyanate, ethyl isothiocyanate, propyl isothiocyanate, isopropyl isothiocyanate, butyl isothiocyanate, isobutyl isothiocyanate, isoamyl isothiocyanate, benzyl isothiocyanate, cyclohexyl isothiocyanate and the like.

Examples of the monoterpene compound include terpene hydrocarbons, terpene alcohols, terpene aldehydes, terpene ketones, terpene oxides and the like.

The water-soluble film forming agent in the humidity-dependent antibacterial powdery composition of the present invention means the one having a property of forming a film when its aqueous solution is dried. The water-soluble film forming agent may be any as long as it constitutes a capsule particle with hygroscopicity, in which the volatile oily antibacterial substance is enclosed, and can release the substance in an atmosphere of a certain humidity or higher. Specific examples thereof include gum arabic, gelatins, hemicelluloses, microbially produced polysaccharides, modified starches and the like. These may be used alone or by combining with two or more kinds. It is known that a water-soluble film forming agent can be used as a constituent of a solid phase in the state of fine particles containing a water-soluble active substance, etc. for dispersing the solid phase in an oil phase (see, for example, JP-A-2000-157168). However, a method of utilizing a water-soluble film forming agent, in which a hygroscopic capsule particle is constituted by the water-soluble film forming agent, whereby a volatile oily antibacterial substance is enclosed, and the enclosed volatile oily antibacterial substance is released outside as the capsule particle absorbs moisture is a new method, which has not been known so far.

The humidity-dependent antibacterial powdery composition of the present invention can be produced by, for example, dissolving and/or dispersing a water-soluble film forming agent optionally together with a powder vehicle in water, subsequently adding a volatile oily antibacterial substance optionally together with an emulsifying agent to the solution and performing an emulsifying treatment, and thereafter spray drying the obtained emulsion into powder.

The powder vehicle, in the case where a substance, which has hygroscopicity even in an atmosphere of about 70% humidity such as gum arabic, is used as a water-soluble film forming agent, effectively functions for securing the stability of releasing the volatile oily antibacterial substance by maintaining the capsule particles constituted by the water-soluble film forming agent in the dispersed state without clumping together in the powdery composition. Specific examples of the powder vehicle include starches, starch decomposition products, dextrins, monosaccharides such as glucose, disaccharides such as lactose and the like. These may be used alone or by combining with two or more kinds. Preferred examples of the powder vehicle include nonhygroscopic starches, dextrins and the like.

The emulsifying agent effectively functions in the case where an emulsion is prepared by using, as a water-soluble film forming agent, a substance other than a substance having an emulsifying action such as gum arabic or Capsul (brand name, manufactured by National Starch and Chemical Co. U.S., a modified starch available from Nippon NSC Ltd. in Japan). Specific examples of the emulsifying agent include polyglycerol fatty acid esters, sucrose fatty acid esters, sorbitan fatty acid esters and the like. These may be used alone or by combining with two or more kinds.

The emulsifying treatment for preparing the emulsion may be carried out in accordance with the conventional methods. It is preferred that the spray drying of the emulsion is carried out at 140 to 180° C. When the temperature is lower than 140° C., dried powder may not be obtained because the moisture cannot be sufficiently evaporated. On the other hand, the temperature is higher than 180° C., the volatile oily antibacterial substance may be volatilized in the process.

Incidentally, after the water-soluble film forming agent optionally together with the powder vehicle is dissolved and/or dispersed in water, the step of adding the volatile oily antibacterial substance optionally together with the emulsifying agent to the solution may be carried out at normal temperature. However, after the water-soluble film forming agent optionally together with the powder vehicle is dissolved and/or dispersed in water at normal temperature, the solution may be heated to about 60 to 80° C. once, or the water-soluble film forming agent optionally together with the powder vehicle is dissolved and/or dispersed in water while heating to about 60 to 80° C. from the beginning, whereby the solubility of the water-soluble film forming agent is increased or the solution is sterilized by heating, and subsequently the solution is cooled down to room temperature to about 60° C., then the volatile oily antibacterial substance optionally together with the emulsifying agent may be added. In addition, the volatile oily antibacterial substance may be added after dissolving it in an edible oil and fat such as a medium chain fatty acid represented by a purified palm oil.

The humidity-dependent antibacterial powdery composition of the present invention produced as above mainly consists of an aggregate of hygroscopic spherical-shaped capsule particles with an average particle size of 1 to 200 μm enclosing the volatile oily antibacterial substance, contains the volatile oily antibacterial substance in high ratio (for example, a composition in which the ratio of the contained volatile oily antibacterial substance is 11 to 20% by weight), and further, the release stability thereof is secured. The humidity-dependent antibacterial powdery composition of the present invention may be used in the form as it is, however, it may be used in the form of a humidity-dependent antibacterial food storing article by carrying the composition on a variety of food storing articles such as synthetic resin film, nonwoven fabric, paper, tray, sheet, bags, containers and tape by a method such as coating or mixing. In order to make the humidity-dependent antibacterial powdery composition of the present invention be the one to be uniformly carried on the food storing article and be the one stably releasing the volatile oily antibacterial substance from the carried powdery composition, the blending ratio of the volatile oily antibacterial substance and the water-soluble film forming agent in the humidity-dependent antibacterial powdery composition is preferably 0.5 to 20 parts by weight, more preferably 1 to 7 parts by weight of the water-soluble film forming agent relative to 1 part by weight of the volatile oily antibacterial substance. In addition, in the case where the powder vehicle is used, the blending ratio thereof is preferably 0.5 to 100 parts by weight, more preferably 0.7 to 20 parts by weight relative to 1 part by weight of the total of the volatile oily antibacterial substance and the water-soluble film forming agent. Incidentally, the average particle size of the capsule particles is preferably 2 to 150 μm, more preferably 5 to 100 μm, and further more preferably 11 to 50 μm. When the average particle size is too small, the amount of the enclosed volatile oily antibacterial substance may be small. On the other hand, when it is too large, it may be difficult to carry the composition on the food storing article.

EXAMPLES

The humidity-dependent antibacterial powdery composition of the present invention will be described in more detail with reference to Examples, however, the present invention is not to be construed as being limited to the following description.

Example 1

Production of Humidity-dependent Antibacterial Powdery Composition and Property Thereof (Part 1)

At 60° C., 250 g of gum arabic as a water-soluble film forming agent and 250 g of starch and 300 g of dextrin as a powder vehicle were added to 1500 g of water and mixed and stirred. After the solution was cooled down to room temperature, 200 g of allyl isothiocyanate as a volatile oily antibacterial substance was added and an emulsifying treatment was carried out with an emulsifier (TK Homo mixer, Tokushu Kika Kogyo), whereby an emulsion was obtained. The obtained emulsion was spray dried with a spray dryer (drying temperature: 150° C.), whereby a light cream-colored powdery composition was obtained. The ratio of allyl isothiocyanate contained in this powdery composition was 13.8% by weight. The obtained powdery composition was observed with a microscope and it was found that this powdery composition mainly consists of an aggregate of spherical-shaped capsule particles. The average particle size of the capsule particles was measured and found to be 50 μm. The irritating smell of allyl isothiocyanate was hardly detected from the obtained powdery composition. Although the irritating smell of allyl isothiocyanate was hardly detected from this powdery composition in an atmosphere of about 60% humidity, the irritating smell of allyl isothiocyanate could be detected in an atmosphere of about 80% humidity. This revealed that this powdery composition releases allyl isothiocyanate depening on humidity.

Experimental Example 1

1-1: Production of Antibacterial Sheet Carrying Humidity-dependent Antibacterial Powdery Composition Two percent by weight of the humidity-dependent antibacterial powdery composition produced in Example 1 was uniformly mixed in an acrylic binder. The obtained mixture was applied on one surface of nonwoven fabric using a roller and the applied surface was pressed to dry using an iron heated at 120° C., thus an antibacterial sheet in which the humidity-dependent antibacterial powdery composition was uniformly dispersed and mixed in the coating film was produced.

1-2: Antibacterial Effect of Antibacterial Sheet

A desoxycholate agar was poured in a petri dish and solidified, and then *E. coli* suspension was applied on its surface. This petri dish in a state of being uncovered with a lid was put in a sealed container of 37° C. in temperature and 100% in humidity, then the growth of *E. coli* was observed grossly. At this time, the one in which the antibacterial sheet (16×10 cm) produced as above was put in the sealed container together with the petri dish was defined as a test group, and the one without an antibacterial sheet was defined as a control group. The results are shown in Table 1. As is clear from Table 1, because allyl isothiocyanate was released effectively in the container from the antibacterial sheet in the test group, an excellent antibacterial effect was observed.

TABLE 1

|  | 24 hours | 48 hours | 72 hours |
|---|---|---|---|
| Test group | − | − | + |
| Control group | ++ | ++ | ++ |

−; no growth of bacteria / +; slight growth of bacteria / ++; apparent growth of bacteria

Experimental Example 2

2-1: Production of Antibacterial Polyethylene Bag Carrying Humidity-dependent Antibacterial Powdery Composition A master batch was produced by uniformly mixing 20% by weight of the humidity-dependent antibacterial powdery composition produced in Example 1 in a polyethylene resin. Five percent by weight of this mater batch was uniformly mixed in a polyethylene resin and the obtained mixture was subjected to an inflation process and an antibacterial polyethylene bag (20×30 cm) of 60 μm in thickness in which the humidity-dependent antibacterial powdery composition was uniformly dispersed and mixed was produced.

2-2: Antibacterial Effect of Antibacterial Polyethylene Bag

As for a test group, 200 g of freshly prepared rice-cake was put in the antibacterial polyethylene bag produced as above, and the bag was heat-sealed and stored at 20° C. and the growth of fungi was observed grossly. In addition, as for a control group, 200 g of freshly prepared rice-cake was put in a polyethylene bag (20×30 cm) of 60 μm in thickness in which the humidity-dependent antibacterial powdery composition was not dispersed or mixed, and the bag was heat-sealed and stored at 20° C. and the growth of fungi was observed grossly. The results are shown in Table 2. As is clear from Table 2, because allyl isothiocyanate was released effectively in the antibacterial polyethylene bag from the bag in the test group, an excellent antibacterial effect was observed. Incidentally, the humidity inside the bag was about 100%.

TABLE 2

|  | 1 week | 2 weeks | 3 weeks |
|---|---|---|---|
| Test group | − | − | − |
| Control group | + | ++ | ++ |

−; no growth of fungi / +; slight growth of fungi / ++; apparent growth of fungi 2-3: Production of Antibacterial Multilayer Synthetic Resin Bag Carrying Humidity-dependent Antibacterial Powdery Composition A master batch was produced by uniformly mixing 20% by weight of the humidity-dependent antibacterial powdery composition produced in Example 1 in a polyethylene resin. Five percent by weight of this mater batch was uniformly mixed in a polyethylene resin and the obtained mixture was laminated on a polyester film by being extruded using a T die, whereby an antibacterial multilayer synthetic resin film was produced. Using the antibacterial multilayer synthetic resin film produced as above, an antibacterial multilayer synthetic resin bag (20×30 cm) consisting of a polyethylene layer of 40 μm in thickness as the inner layer, in which the humidity-dependent antibacterial powdery composition was uniformly dispersed and mixed, and a polyester layer of 12 μm in thickness as the outer layer was produced. Such an antibacterial multilayer synthetic resin bag consisting of a synthetic resin layer, in which the humidity-dependent antibacterial powdery composition is uniformly dispersed and mixed, as the inner layer and a synthetic resin layer, in which the humidity-dependent antibacterial powdery composition is not dispersed or mixed, as the outer layer has a release directivity in which the volatile oily antibacterial substance is released only inside the bag.

Example 2

Production of Humidity-dependent Antibacterial Powdery Composition (Part 2)

At 60° C., 300 g of gum arabic and 400 g of dextrin were added to 1500 g of water and mixed and stirred. After the solution was cooled down to room temperature, a solution obtained by dissolving 200 g of allyl isothiocyanate in 100 g of purified palm oil was added. In the same manner as in Example 1, a white-colored powdery composition mainly consisting of an aggregate of spherical-shaped capsule particles with an average particle size of 50 μm was obtained. The ratio of allyl isothiocyanate contained in this powdery composition was 15.8% by weight.

Example 3

Production of Humidity-dependent Antibacterial Powdery Composition (Part 3)

At 80° C., 700 g of Capsul was added to 1500 g of water and mixed and stirred. After the solution was cooled down to room temperature, a solution obtained by dissolving 150 g of allyl isothiocyanate in 150 g of purified palm oil was added. In the same manner as in Example 1, a light yellow-colored powdery composition mainly consisting of an aggregate of spherical-shaped capsule particles with an average particle size of 50 μm was obtained. The ratio of allyl isothiocyanate contained in this powdery composition was 12.5% by weight.

Example 4

Production of Humidity-dependent Antibacterial Powdery Composition (Part 4)

At 80° C., 850 g of Capsul was added to 1500 g of water and mixed and stirred. After the solution was cooled down to room temperature, 150 g of allyl isothiocyanate was added. In the same manner as in Example 1, a light yellow-colored powdery composition mainly consisting of an aggregate of spherical-shaped capsule particles with an average particle size of 30 μm was obtained. The ratio of allyl isothiocyanate contained in this powdery composition was 13.2% by weight.

Example 5

Production of Humidity-dependent Antibacterial Powdery Composition (Part 5)

At normal temperature, 700 g of gum arabic was added to 1500 g of water and mixed and stirred. Then, a solution obtained by dissolving 200 g of allyl isothiocyanate in 100 g of purified palm oil was added. In the same manner as in Example 1, a white-colored powdery composition mainly consisting of an aggregate of spherical-shaped capsule particles with an average particle size of 50 μm was obtained. The ratio of allyl isothiocyanate contained in this powdery composition was 16.4% by weight.

Experimental Example 3

3-1: Allyl Isothiocyanate Releasing Property of Humidity-dependent Antibacterial Powdery Compositions obtained in Examples 2 to 5

The allyl isothiocyanate releasing ratios of the humidity-dependent antibacterial powdery compositions obtained in Examples 2 to 5 at humidities of 60%, 70%, 75% and 100% are shown in Table 3 together with the releasing ratios of a known humidity-dependent antibacterial powdery composition in which allyl isothoicyanate was enclosed in a cyclo-dextrin (CD inclusion: see, for example, Japanese Patent No. 2,790,772) (the releasing ratios were calculated from the residual ratios of allyl isothiocyanate in the humidity-dependent antibacterial powdery compositions after releasing). As is clear from Table 3, the release of allyl isothiocyanate from the humidity-dependent antibacterial powdery compositions obtained in Examples 2 to 5 was observed from 70% of humidity in each case. The compositions show the behavior of release in which the releasing ratio of allyl isothiocyanate at 100% humidity is 1.5 times or more than the releasing ratio of allyl isothiocyanate at 75% humidity, which reveals that these are a humidity-dependent antibacterial powdery composition showing unprecedented excellent behavior of release.

TABLE 3

| | Humidity-dependent antibacterial powdery composition | | | | |
|---|---|---|---|---|---|
| Releasing ratio (%) | Example 2 | Example 3 | Example 4 | Example 5 | CD inclusion |
| 60% RH | 0 | 0 | 0 | 0 | 0 |
| 70% RH | 4.2 | 4.4 | 3.8 | 4.6 | 0 |
| 75% RH | 49.8 | 45.1 | 21.2 | 46.2 | 0 |
| 100% RH | 88.8 | 82.0 | 88.4 | 87.1 | 80.0 |

3-2: Heat-resistant Property of Humidity-dependent Antibacterial Powdery Compositions Obtained in Examples 2 to 5

The residual ratios of allyl isothiocyanate in the humidity-dependent antibacterial powdery compositions obtained in Examples 2 to 5 are shown in Table 4 together with the residual ratios of a known humidity-dependent antibacterial powdery composition in which allyl isothoicyanate was enclosed in a cyclodextrin (CD inclusion: see, for example, Japanese Patent No. 2,790,772) when the humidity-dependent antibacterial powdery compositions were heated at 180° C. As is clear from Table 4, the humidity-dependent antibacterial powdery composition obtained in Example 4 was more excellent in heat-resistance than the known humidity-dependent antibacterial powdery composition.

TABLE 4

| | Humidity-dependent antibacterial powdery composition | | | | |
|---|---|---|---|---|---|
| Residual ratio (%) | Example 2 | Example 3 | Example 4 | Example 5 | CD inclusion |
| Starting point | 100 | 100 | 100 | 100 | 100 |
| After 5 minutes | 75.4 | 75.6 | 96.7 | 80.1 | 92.5 |
| After 10 minutes | 69.1 | 69.9 | 92.7 | 75.7 | 83.3 |
| After 15 minutes | 64.2 | 67.6 | 90.9 | 73.6 | 75.2 |
| After 20 minutes | 62.7 | 65.4 | 88.4 | 71.8 | 70.4 |

Industrial Applicability

According to the present invention, a humidity-dependent antibacterial powdery composition of excellent applicability wherein a volatile oily antibacterial substance can be contained in high ratio; a process for producing the same; a humidity-dependent antibacterial food storing article; and a method of storing food are provided.

The invention claimed is:
1. A humidity-dependent antibacterial food storing article, the food storing article comprising a resin into which a humidity-dependent antibacterial powdery composition has been mixed, said humidity-dependent antibacterial powdery composition comprising:
- a volatile oily antibacterial substance and a water-soluble film forming agent, wherein the behavior of release of the antibacterial substance changes depending on humidity,
- wherein said humidity-dependent antibacterial powdery composition comprises an aggregate of hygroscopic spherical-shaped capsule particles enclosing the volatile oily antibacterial substance;
- said capsule particles comprise a water-soluble film forming agent; and
- said volatile oily antibacterial substance is an isothiocyanate ester.

2. The humidity-dependent antibacterial food storing article according to claim 1, wherein the water-soluble film forming agent is gum arabic.

3. The humidity-dependent antibacterial food storing article according to claim 1, wherein the composition further comprises a powder vehicle.

4. The humidity-dependent antibacterial food storing article according to claim 1, wherein the composition shows the behavior of release wherein the releasing ratio of the volatile oily antibacterial substance at 100% humidity is 1.5 times or more than the releasing ratio of the volatile oily antibacterial substance at 75% humidity.

5. The humidity-dependent antibacterial food storing article according to claim 1, wherein the food storing article is selected from the group consisting of synthetic resin film, nonwoven fabric, paper, tray, sheet, bags, containers and tape.

6. The humidity-dependent antibacterial food storing article according to claim 1, wherein the humidity-dependent antibacterial powdery composition is in the resin in a uniformly dispersed state.

7. A process for producing a humidity-dependent antibacterial food storing article according to claim 1, in which the behavior of release of a volatile oily antibacterial substance is changed depending on humidity, characterized in that a water-soluble film forming agent optionally together with a powder vehicle is dissolved and/or dispersed in water, subsequently a volatile oily antibacterial substance optionally together with an emulsifying agent is added to the solution and emulsified, and thereafter the obtained emulsion is spray dried into powder, and
- mixing the powder composition in a resin which is formed into or coated onto an article.

8. A method of storing food characterized in that a volatile oily antibacterial substance is released from a humidity-dependent antibacterial food storing article according to claim 1 toward food lying in an atmosphere of 70% or higher humidity.

9. A humidity-dependent antibacterial food storing article comprising a humidity-dependent antibacterial powdery composition coated on the food storing article in a coating film, said humidity-dependent antibacterial powdery composition comprising:
- a volatile oily antibacterial substance and a water-soluble film forming agent, wherein the behavior of release of the antibacterial substance changes depending on humidity,
- wherein said humidity-dependent antibacterial powdery composition comprises an aggregate of hygroscopic spherical-shaped capsule particles enclosing the volatile oily antibacterial substance;
- said capsule particles comprise a water-soluble film forming agent and
- said volatile oily antibacterial substance is an isothiocyanate ester.

* * * * *